United States Patent
Chawla et al.

(10) Patent No.: US 6,243,371 B1
(45) Date of Patent: Jun. 5, 2001

(54) METHOD AND APPARATUS FOR INTERFERENCE AVOIDANCE IN A WIRELESS COMMUNICATION SYSTEM

(75) Inventors: Kapil K. Chawla; Xiaoxin Qiu, both of Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/991,571

(22) Filed: Dec. 16, 1997

(51) Int. Cl.[7] .................................................. H04B 7/212
(52) U.S. Cl. ............................................... 370/347; 455/63
(58) Field of Search ..................................... 370/328, 332, 370/333, 329, 336, 337, 341, 345, 347, 431, 442; 375/226, 224, 225, 227; 455/63, 67.1, 67.3

(56) References Cited

U.S. PATENT DOCUMENTS

| | | | |
|---|---|---|---|
| 5,764,631 | * 6/1998 | Ueda | 370/332 |
| 5,862,130 | * 1/1999 | Tat et al. | 370/330 |
| 5,903,840 | * 5/1999 | Bertacchi | 455/436 |
| 5,995,498 | * 11/1999 | Toot, Jr. et al. | 370/332 |
| 6,002,673 | * 12/1999 | Kahn et al. | 370/252 |
| 6,108,322 | * 8/2000 | Kotzin et al. | 370/333 |

OTHER PUBLICATIONS

IEEE Communications Letters, vol. 1, No. 4, Jul. 1997, pp. 108–110.

Proceedings of the Sixth WINLAB Workshop, Mar. 1997, pp. 89–121.

* cited by examiner

Primary Examiner—Ajit Patel
(74) Attorney, Agent, or Firm—Kenyon & Kenyon

(57) ABSTRACT

A method and apparatus for managing interference in a wireless communications system. Each base generates a predictable beam-off sequence, and terminals measure the received signal over time. This received signal is then used to estimate or measure performance to schedule transmissions to the terminal.

11 Claims, 5 Drawing Sheets

METHOD AND APPARATUS FOR INTERFERENCE AVOIDANCE IN A WIRELESS COMMUNICATION SYSTEM

FIELD OF THE INVENTION

The present invention relates to transmission schemes for wireless communications systems. More particularly, the present invention relates to a method and apparatus for minimizing inter-cell interference in a wireless communications system.

BACKGROUND OF THE INVENTION

Wireless communications systems use different techniques to allow many users to share simultaneously a finite radio spectrum. One technique is to split the spectrum into smaller portions and to assign one or more of these to each user. This technique is called Frequency Division Multiplexing (FDM). Another technique is to allocate to each user a unique spreading code. This technique is called Code Division Multiplexing (CDM). The third technique is to split time into small intervals and assign each user one or more of these intervals. This technique is called Time Division Multiplexing (TDM). Most wireless communications systems use a hybrid of these techniques.

TDM uses a frame and time slots within the frame. Time is split into frames, each of which is a fixed interval of time; each frame is further divided into a fixed number of time slots. A user is assigned one or more time slots for the purpose of communications.

TDM systems transmit data in a buffer-and-burst method; thus, the transmission for any user is non-continuous. For example, FIG. 6 illustrates 5 time frames each divided into 4 slots. The time frames and slots are usually all of equal width, and a broadcast using TDM would send a signal to a given terminal only within one slot, for example slot 3, of a frame. The transmission from various users can be interlaced into the repeating frame structure shown in FIG. 6. To increase the system capacity, the same radio resource, for example, time slot, frequency, or code, can be used simultaneously in the same cell or different cells.

A given terminal typically receives a transmission only during its given time slot and only from its serving base. However, a terminal can also receive signals from other sources during that time slot. These unintentionally-received signals are types of interference, and are the major limiting factors in wireless-system performance. Possible sources of interference include a transmitter in the same or neighboring cell, other base stations operating in the same or adjacent frequency band, or any other system which inadvertently leaks energy into the frequency band.

This interference is not limited to interference from direct, line-of-sight broadcasts. It can also be caused by transmitted radiation reflecting from fixed sources both inside and outside a given cell. Furthermore, atmospheric conditions may add to the various interference problems, and these effects can change randomly over time.

One way to reduce this interference is to divide the radio spectrum into different frequency sets or bands, and to assign the same set to cells that are relatively far apart. This is the concept of frequency reuse and is commonly used in current cellular systems. Cells that use the same frequency set are called co-channel cells, and the interference between signals from these cells is called co-channel interference. One drawback of this fixed reuse technique is that it reduces the capacity in each cell. Further, to support high data rate applications, it is very desirable that each cell have the ability to use fully the available radio resource.

This can be accomplished by intelligently scheduling transmissions in specific time slots to reduce interference from other concurrent transmissions, thereby achieving a high transmission-success probability. Because the interference arises from concurrent transmissions both in the same cell and from other cells, if there is a central controller in the system with global information which can coordinate the transmissions in real time, optimal performance can be achieved. However, while the assumption of a central controller is valid for single-cell wireless systems, it is not valid for multi-cell environments. This is due to the excessive communication bandwidth and processing necessary for a central controller in a multi-cell environment. Therefore, interference management among bases has to be done in a de-centralized fashion, i.e., distributed management is necessary.

A consequence of this distributed management is that the transmissions of one base can interfere with the terminals of other bases. The lack of any centralized coordination makes this interference difficult to predict or prevent. Therefore, typically, inter-cell interference is the capacity bottleneck of the overall system. The situation is exacerbated in packet-switched systems where it is very inefficient to use real-time interference sensing with feedback for the interference management.

Many techniques have been proposed for the inter-cell interference management in a broadband wireless system. Capture Division Packet Access (CDPA), which is targeted for mobile applications, uses the system resource in a completely uncoordinated fashion. A base transmits whenever it has a packet to transmit, and this packet is received successfully as long as the interference from nearby bases is acceptable. Transmission failures are taken care of by higher layer protocols such as Automatic Repeat reQuest (ARQ).

Other techniques, targeted for fixed wireless systems, have also been proposed. One algorithm, called Staggered Resource Allocation algorithm (SRA), adopts a system-planning approach for interference management in a fixed wireless system. The key concept of SRA is to identify the major sources of interference for each sector, and to schedule transmissions accordingly to avoid them. One limitation of SRA is that the identification of major interference sources is based on the geometric locations of cells and sectors. In reality, it is difficult to predict major interference sources based solely on geometry. In addition, in a real system where the bases may not be located on a hexagonal grid, designing an appropriate transmission schedule may involve an excessive amount of effort.

Another scheme, a so-called Time Slot Reuse Partitioning (TSRP) scheme, has been proposed for handling the inter-cell interference. TSRP requires the system to have more than one reuse pattern in the time domain. The different reuse patterns provide a terminal with differing levels of performance assurance which can then be used both to equalize performance across terminals and to offer different levels of performance assurance at each terminal. TSRP adopts a system-planning approach to provide a certain degree of coordination among different bases. However, TSRP is targeted for systems with a few or even one sector per base. Unfortunately, embedding a reuse pattern in TSRP implies that some of the resource cannot be reused in every cell, thus leading to a loss in efficiency.

SUMMARY OF THE INVENTION

To help solve these problems, an embodiment of the present invention introduces a novel inter-cell interference management technique called Dynamic Resource Allocation with Interference Avoidance (DRA-IA). DRA-IA is suitable for systems with several sectors per base. As the capacity requirements increase, wireless systems are expected to evolve to multi-sectored systems. This can be achieved using highly directive antennas, phased arrays or adaptive arrays at the bases. DRA-IA can be used with any of these architectures.

DRA-IA provides a marked improvement in the Packet Error Rate (PER) performance of terminals with high error rates, that is, the terminals for which this improvement is most useful. This improvement translates to improved coverage and throughput, and also reduces the burden on higher layer protocols to ensure fairness and Quality of Service (QoS).

The present invention considers as a context a fixed, broadband, packet-switched Time Division Multiple Access (TDMA) wireless network, which supports multimedia services that may require a high data rate. The system can consist of multiple cells, each having multiple sectors or fixed or adaptive beams, using phased arrays or adaptive arrays. User terminals have directional antennas that point to the serving base. To support the high bit rate, each cell has the ability to fully use the allocated spectrum. Time is divided into fixed length time-frames and each time-frame in turn is divided into a fixed number of slots. Of course, the invention is not limited to this context.

The present invention uses fixed time slots as reference points during which specific sectors of a cell's base are shut down in a predictable way, so that the change in interference can be measured at a terminal in another cell and that terminal's server base can take advantage of these predictable shut offs. This is called a "beam-off sequence." Different TDMA wireless standards have different TDMA frame structures, and this invention presupposes identical, or at least predictable, TDMA frame structures. Furthermore, it is not so important for each terminal to occupy a cyclically-repeating time slot as it is for the terminal to occupy a predictable time slot.

DRA-IA takes advantage of the fact that a large percentage of interference detected at a terminal results from transmissions in other cells being unintentionally received at that terminal. If this interference can be removed, at least periodically, a terminal can receive its intended transmission with a much higher degree of accuracy. In DRA-IA, every base periodically or predictably "turns-off" each of its sectors or beams for a certain amount of time. This periodic or predictable turn-off introduces a predictable non-uniformity in a terminal's performance, and therefore permits each terminal to identify a preferred time period for transmission. For example, a user that receives high interference from a particular beam of another base would see significantly better performance in the time period that this beam is turned off.

Therefore, DRA-IA requires that each base have an appropriate "beam-turn-off" sequence and each terminal or receiver perform signal sensing to calculate the interference level. This beam-off according to the beam-off sequence is implemented in at least one cell, and possibly all cells, allowing for at least one time slot during which interference levels at a given terminal are reduced. The signal sensing is performed in each time slot to identify the preferred time-slots of a given terminal, and is performed independent of what is taking place in other cells. In other words, preferred transmission time slots for a given terminal will exist because of the beam-turn-off schedule in other cells, even though the different cells do not communicate with one another. This information, in turn, is then gathered at each base station and used in transmission scheduling.

DETAILED DESCRIPTION

Figure 1:
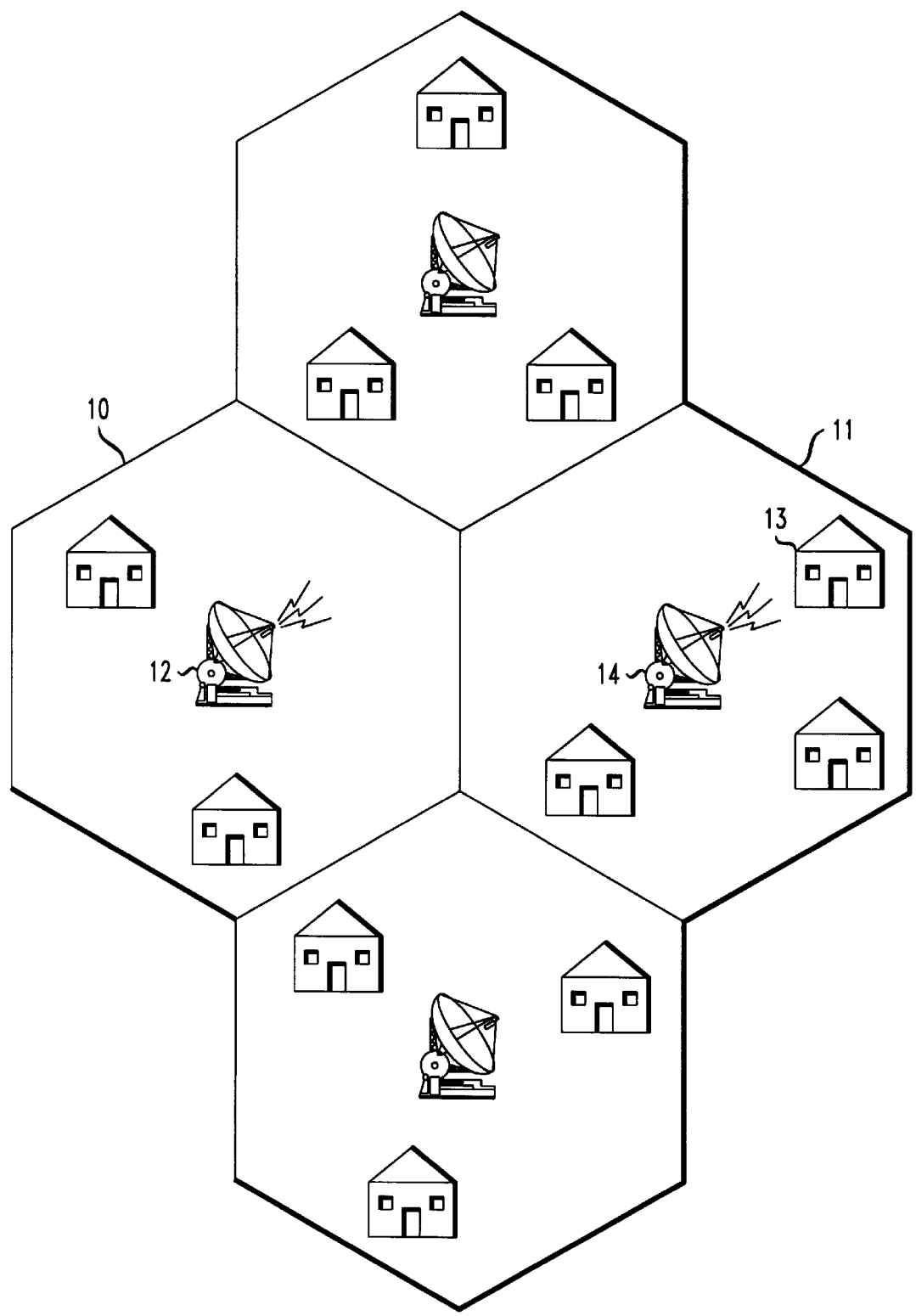
FIG. 1 is a representation of a prior-art implementation of a wireless communication system.

The present invention is directed to a method and apparatus for minimizing inter-cell transmission interference. FIG. 1 illustrates a representation of a prior-art implementation of a wireless system. In this typical system, broadcast areas are divided up into cells (e.g., cell 10 and cell 11), and each cell has a serving base that processes and transmits, in specific sectors, a wireless signal to its terminal. For example, FIG. 1 displays a serving base 14 which intentionally transmits a wireless signal to its terminal 13.

As a context for discussing the present invention, assume that a sector in cell 10 using base 12 transmits a signal during a given time slot and terminal 13 in a sector in cell 11 unintentionally receives this signal during the same time slot as it intentionally receives a signal from base 14. Because the signal from base 12 in cell 10 arrives at terminal 13 at the same time as the signal from base 14 in cell 11, terminal 13 receives interference from base 12 in cell 10. For the purposes of this invention, interference means any signal received which is not the intended signal, and can be measured in any known way, including measuring the signal-to-interference ratio (SIR) or the packet-error rate (PER).

The above context uses the base as a transmitter and a terminal as a receiver. However, the present invention can also work in situations in which the terminal is the transmitter and the base is the receiver. Therefore, for the sake of clarity, the words "base" and "terminal" have been used to mean "transmitter" and "receiver," respectively. Furthermore, for the purposes of the present invention, a "serving base" simply means a transmitter that sends a signal to a receiver in the same cell; an interfering transmitter is defined as any transmitter whose transmission is unintentionally received at a receiver; a receiver's serving transmitter is defined as any transmitter that transmits with the intention of being received by that receiver.

Figure 2:
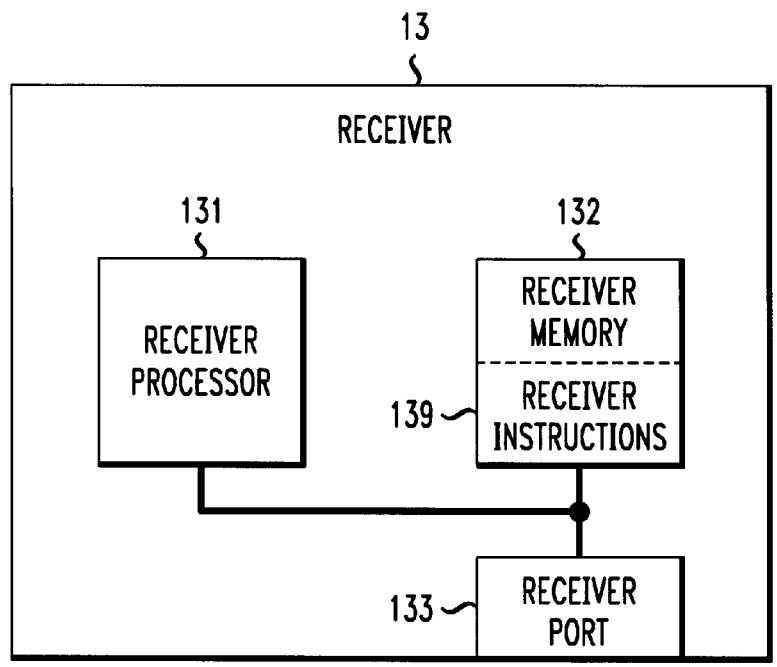
FIG. 2 is a diagram of an apparatus according to an embodiment of the present invention.

FIG. 2 shows a diagram of a terminal apparatus according to an embodiment of the present invention. Terminal 13 is comprised of a terminal processor 131, a terminal memory 132, and a terminal port 133. The terminal port is adapted to be coupled to a device which transmits information. For example, the terminal port may be coupled to an antenna which is capable of receiving and transmitting information. The terminal memory stores terminal instructions 139 adapted to be executed by the terminal processor 131 to receive signals through the port during a time slot in a time frame, determine the preferred transmission time based upon the received transmission, and relay the preferred transmission time to the terminal's serving base. The received signal enters terminal 13 through terminal port 133.

In one embodiment of the present invention, terminal memory 132 stores terminal instructions 139 adapted to be executed by the terminal processor to receive one or more transmissions during at least one time slot, estimate the performance of the terminal within the time frame, and then relay this information to its serving base. Estimating the performance means calculating the PER or SIR or any other known way of gauging performance.

Figure 3:
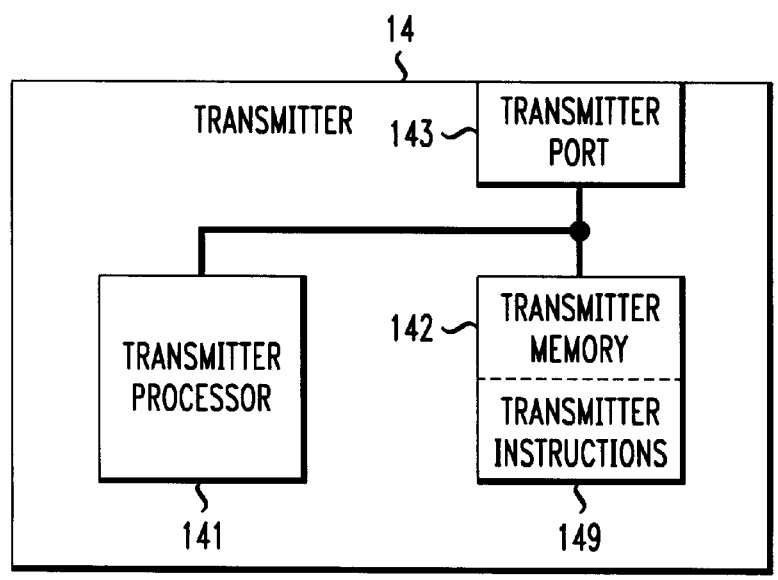
FIG. 3 is a diagram of an apparatus according to another embodiment of the present invention.

FIG. 3 shows a diagram of a base apparatus according to another embodiment of the present invention. Base 14 is comprised of a base processor 141, a base memory 142, and a base port 143. The base memory stores base instructions 149 adapted to be executed by the base processor to receive transmissions from a terminal and determine the preferred transmission time slot of the terminal based upon the signal received from the terminal. Furthermore, this information may be used to generate a predictable beam-off sequence that takes into account the terminal's preferred-transmission time slot.

In one embodiment of the present invention, base memory 142 stores base instructions 149 adapted to be executed by base processor 141 to estimate the terminal's performance based upon information received from the terminal.

Figure 4:
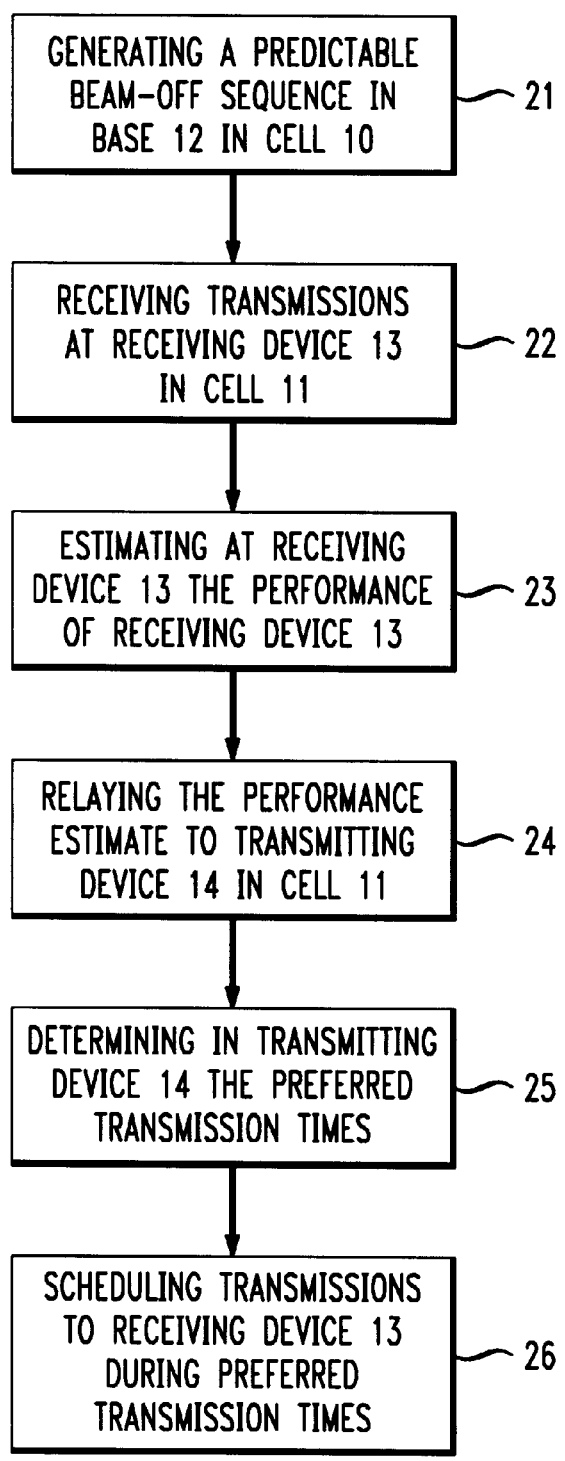
FIG. 4 is a flow chart of a method according to one embodiment of the present invention.

FIG. 4 is a flow chart of a method for managing interference in a wireless communication system, according to an embodiment of the present invention. First, at step 21, using time frames of known length divided into slots of known length, a predictable beam-off sequence is generated at base 12 in cell 10. Specifically, at step 21, a sector in base 12 in cell 10 refrains from broadcasting during a predictable slot in every time frame. This beam switching off takes place at least in one sector of one cell, but should take place in every sector of every cell because, presumably, every sector of every cell transmits and, in principle, these transmissions can interfere with terminals of other cells. The beam-off sequence need not be known outside the cell in which the beam off sequence is generated. At step 22, during one or more time slots, a receiver 13 in cell 11 receives one or more transmissions. In one embodiment, receiver 13 estimates the performance of receiver 13 in various time slots, and then relays this estimate to transmitter 14. Transmitter 14 then uses this estimate to determine the preferred transmission time and schedule transmissions to receiver 13 accordingly.

Figure 5:
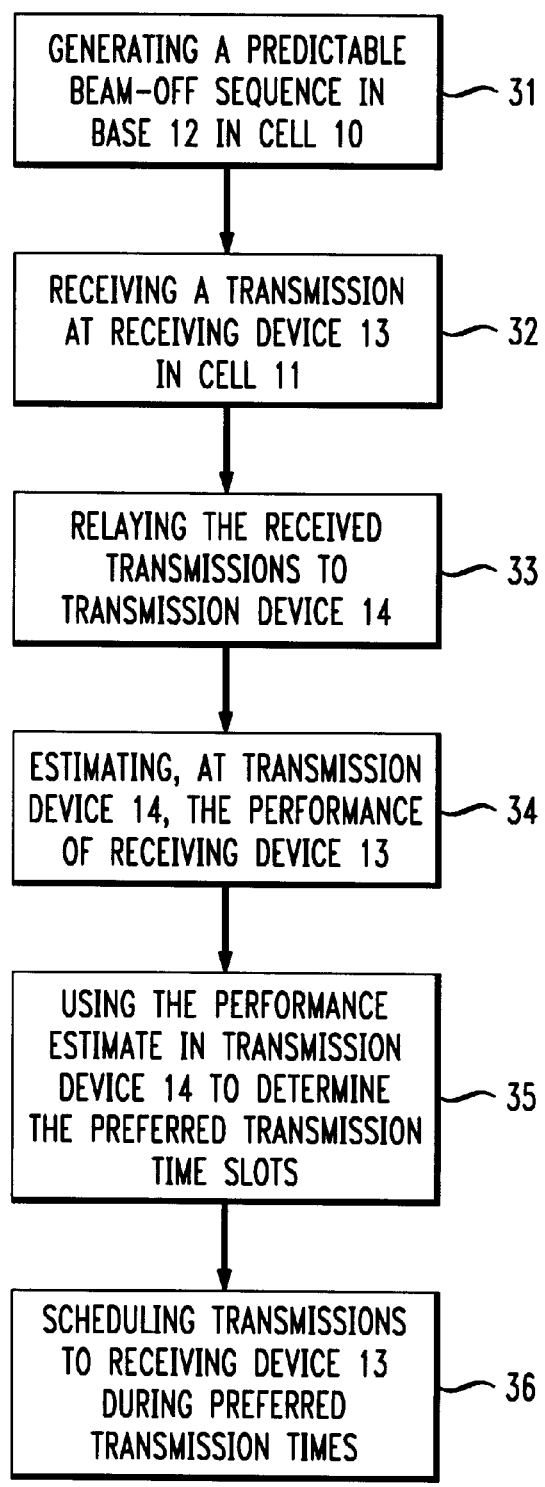
FIG. 5 is a flow chart of a method according to another embodiment of the present invention
Figure 6:
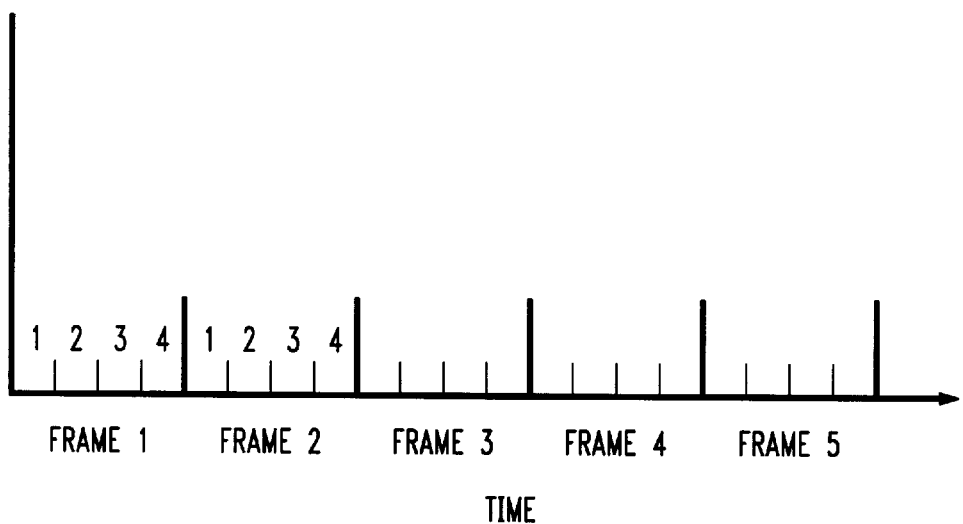
FIG. 6 illustrates a plurality of TDMA time frames.

FIG. 5 is a flow chart of a method for managing interference in a wireless communication system, according to another embodiment of the present invention. In this embodiment, at step 31, using time frames of known length divided into slots of known length, a predictable beam-off sequence is generated by an interfering transmitter at base 12, for a sector in cell 10. At step 32, during one or more time slots, a receiver 13 in cell 11 receives one or more transmissions. Receiver 13 then relays general information about the received transmission to transmission device 14. Transmission device 14 uses this relayed information to estimate the performance of receiver 13. Using this performance estimate, transmitter 14 determines a preferred transmission time for the receiver and schedules transmissions to receiver accordingly. Again, this transmission schedule can be accommodated when determining transmission device 14's beam-off sequence.

A preferred transmission time slot is defined as a time slot during which a terminal can, through proper timing techniques, more practically and more efficiently receive an intended signal than otherwise. This preferred transmission time slot can coincide with the overall minimum value of the interference in a time frame, or it can coincide with some other interference value that, while not the absolute minimum within the time frame, is preferred for other reasons. Furthermore, the interference estimate can be represented by the signal-to-interference ratio (SIR) or packet-error rate (PER) or any other performance measure.

Figure 7:
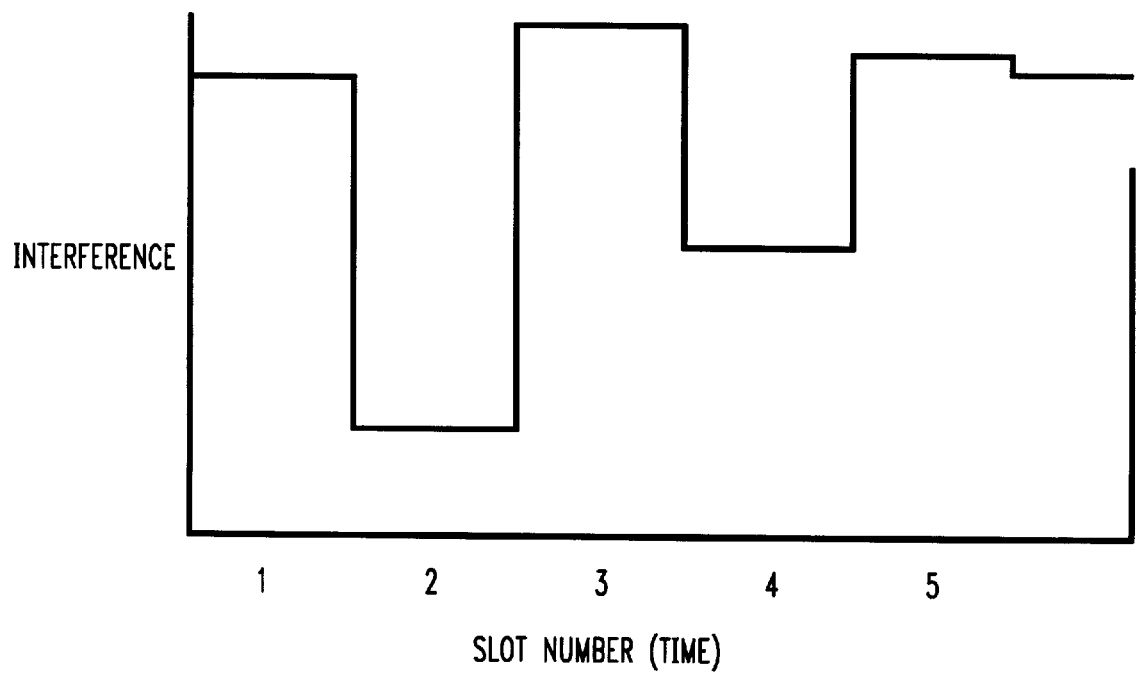
FIG. 7 illustrates a graph of interference vs. time, where time is represented as discrete slot numbers in a time frame.

For example, FIG. 7 is a graph of interference value per slot number during a time frame. Interference, the vertical axis, can be represented by any known parameter that represents interference (e.g., SIR or PER). In this time frame, an overall minimum occurs within the shown time frame during slot 2. However, because broadcasting during this time slot may not be possible because the serving base is busy with other broadcasts, another preferred transmission time slot will be found in slot 4.

Once the preferred transmission time slots are determined, base 14 can schedule and transmit to terminal 13 during the preferred transmission time slot.

What is claimed is:

1. A method for managing interference in a wireless communications system comprising the steps of:
   (a) Estimating the performance of a receiver in a first cell during a plurality of time slots during a beam-off sequence of a transmitter in a second cell; and
   (b) determining a preferred transmission time slot based upon the estimate of the receiver's performance.

2. The method of claim 1, wherein step (a) is performed at the receiver's serving transmitter.

3. The method of claim 1, wherein step (a) is performed at the receiver, and further comprising the step of
   (c) receiving, by the serving transmitter, a signal from the receiver that contains information about the estimate of the receiver's performance.

4. The method of claim 1, further comprising the step of
   (c) performing a beam-off sequence in a plurality of sectors within the cells by switching off a transmitter's beam according to a generated beam-off sequence.

5. An apparatus for managing interference in a wireless communications system comprising:
   (a) a receiver processor;
   (b) a receiver memory that stores instructions adapted to be executed by said receiver processor to:
      (i) receive a signal in a plurality of time slots during a beam-off sequence;
      (ii) determine a preferred transmission time slot based upon the received signal; and
   (c) a receiver port through which signals are received, with said receiver port and said receiver memory coupled to said receiver processor.

6. The apparatus in claim 5, further comprising:
   (b) a receiver memory storing instructions adapted to be executed by said receiver processor to
      (i) estimate the performance of the receiver in different time slots;
      (ii) transmit the estimate to a base transmitter.

7. An apparatus for managing interference in a wireless communications system comprising:
   (a) a transmitter processor;
   (b) a transmitter memory that stores instructions adapted to be executed by said transmitter processor to schedule a transmission based upon the performance of the receiver over a plurality of time slots during a beam-off sequence; and (c) a port through which signals sent, with said transmitter port and said transmitter memory coupled to said transmitter processor.

8. The apparatus in claim 7, further comprising a transmitter memory that stores instructions adapted to be executed by said transmitter processor to generate a predictable beam-off sequence.

9. The apparatus in claim 7, further comprising:
(d) a transmitter memory storing instructions adapted to be executed by said transmitter processor to estimate the performance of the receiver based on information set from a receiving device.

10. A system for managing interference in a wireless communication system comprising:
(a) means for estimating the performance of a receiver in a first cell during a plurality of time slots during a beam-off sequence of a transmitter in a second cell; and
(b) means for determining a preferred transmission time slot based upon the estimate of the receiver's performance.

11. The system of claim 10, wherein step (a) is performed at the receiver's serving transmitter.

* * * * *